United States Patent
Grebenschikov

(10) Patent No.: US 10,942,839 B2
(45) Date of Patent: Mar. 9, 2021

(54) SYSTEM AND METHOD FOR DEBUGGING APPLICATIONS ON A DEVELOPER WORKSTATION

(71) Applicant: Ingram Micro Inc., Irvine, CA (US)

(72) Inventor: Vladimir Grebenschikov, Moscow (RU)

(73) Assignee: INGRAM MICRO INC., Irvine, CA (US)

( * ) Notice: Subject to any disclaimer, the term of this patent is extended or adjusted under 35 U.S.C. 154(b) by 0 days.

(21) Appl. No.: 15/337,144

(22) Filed: Oct. 28, 2016

(65) Prior Publication Data

US 2018/0121327 A1   May 3, 2018

(51) Int. Cl.
*G06F 11/36* (2006.01)

(52) U.S. Cl.
CPC ................... *G06F 11/3664* (2013.01)

(58) Field of Classification Search
CPC .................................................. G06F 11/3664
USPC .......................................................... 717/124
See application file for complete search history.

(56) References Cited

U.S. PATENT DOCUMENTS

| | | | | |
|---|---|---|---|---|
| 8,516,449 B2* | 8/2013 | Artzi | ................... | G06F 11/3604 717/124 |
| 2011/0067004 A1* | 3/2011 | Birsan | ................. | G06F 11/3664 717/125 |
| 2015/0135165 A1* | 5/2015 | Simernitski | ......... | G06F 11/3664 717/124 |

* cited by examiner

*Primary Examiner* — Ryan D. Coyer
(74) *Attorney, Agent, or Firm* — Ice Miller LLP

(57) ABSTRACT

A system and method for debugging web applications, the system comprising a multiplexer, and a workstation comprising a debug environment, wherein the multiplexer is configured to redirect to the debug environment, any debugging request, the debug environment further configured to instantiate a development version of a web application, and debugging the development web application in the debug environment.

12 Claims, 2 Drawing Sheets

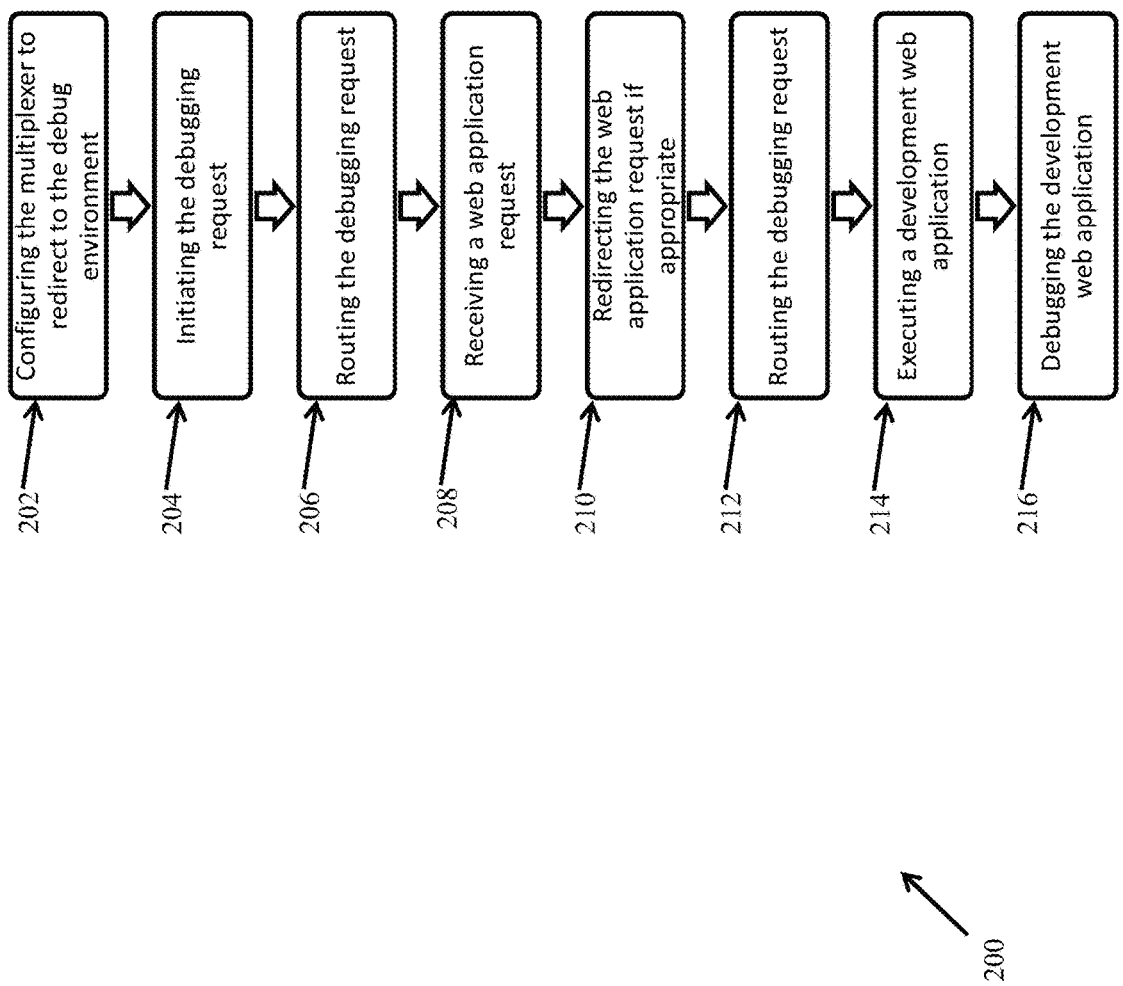

SYSTEM AND METHOD FOR DEBUGGING APPLICATIONS ON A DEVELOPER WORKSTATION

TECHNICAL FIELD

This invention relates to a system and method for debugging applications on a developer workstation, and more particularly, to debugging server-side applications on a remote developer's workstation in real time.

BACKGROUND

Web applications are usually hosted on web servers or web server infrastructures. Web applications are usually implemented as part of a software development lifecycle, where the web applications are developed on a development and/or test environment. After development, the web application is promoted to a production environment where the web application is 'live' and is in use (i.e. considered to be in production use).

Traditionally, the test and/or development environments are separate from the production environment. The test/development environment contains a copy of the production web application. Test/development environments also have their own database. This development database often is a copy of the production database, or contains a subset of the production data. Using production 'quality' data in the test/development environment provides for more thorough testing. However, an issue with such a scheme is that the test/development environments have to be constantly (or periodically) refreshed with production data, which requires additional time and effort.

Separating test/development environments from production environments also ensures that test and development operations do not affect production operations, and vice versa. Furthermore, the production environment is a tightly controlled environment where changes to the web applications therein, or any other aspects of the production environment are closely governed. This ensures that unforeseen changes or any changes that may impact the availability of the 'live' web applications are limited. The test/development environments on the other hand, are set up to be more conducive to routine changes. For example, a development environment can see constant source code changes to a web application as part of the software development lifecycle.

Traditionally, testing occurs in the test/development environment. For example an application error in a web application, experienced in the production environment, may be debugged in the test and/or development environments. This is because troubleshooting activities can have an adverse impact on the production environment, and therefore, keeping such impact minimal would require the use of a test and/or development environment, as a matter of best practice.

In some cases however, production web applications may need to be debugged to troubleshoot problems identified in its 'live' use. In such situations, debugging will have to occur directly on the production environment if the issue(s) cannot be reproduced in test/development environments. In such cases, a web application developer may incorporate development tools or platforms (e.g. integrated development environments or IDE) to assist with the debugging/troubleshooting. However, debugging and troubleshooting in production presents numerous problems. For example, production environment's performance or stability may be compromised due to this debugging, or the security of the production environment may be compromised as well. Other times, using an IDE in a production environment can cause other unforeseen problems thereby precluding such techniques.

Another issue is that the source code and/or compiled code for the web application must be synchronized between the test/development and production environments. This is to ensure that the test/development environments offer a 'production-like' environment where behavior in the test/development environments mimics expected behavior of the web application in the production environment. This however, can be problematic as well because any inconsistencies in the synchronization will lead to unexpected behavior caused by the disparities between the test/development environments and the production environment.

Therefore, there is a need for a system and method for debugging applications on a developer workstation.

SUMMARY

The present disclosure discloses a system and method for debugging applications on a developer workstation in real time.

In at least on embodiment of the present disclosure, a method for debugging applications on a developer workstation in real time includes: configuring a multiplexer to redirect to the debug environment, a debugging request; initiating at a workstation, a debugging request; routing by a network, the debugging request to a web infrastructure; receiving at the multiplexer, a web application request; redirecting at the multiplexer, the web application request, if it is determined the web application request comprises the debugging request; routing by the network, the debugging request to the debug environment; operating at the debug environment, a development web application; and debugging at debug environment, the development web application, in real time.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein:

FIG. 2 displays a flowchart of a method for debugging applications on a developer workstation.

DETAILED DESCRIPTION

Figure 1:
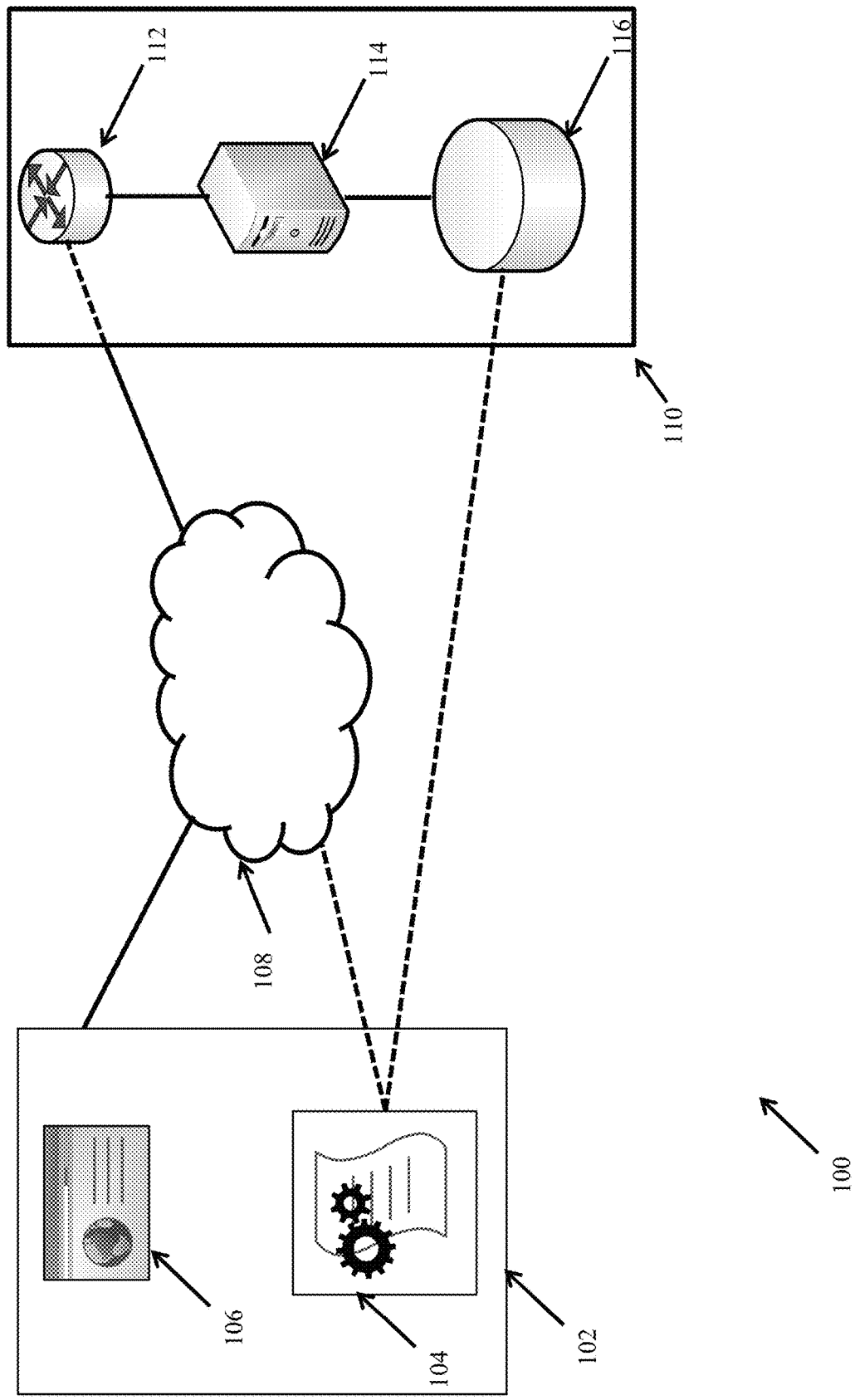
FIG. 1 displays a schematic drawing of a method for debugging applications on a developer workstation.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

This detailed description is presented in terms of programs, data structures or procedures executed on a computer or network of computers. The software programs implemented by the system may be written in any programming language—interpreted, compiled, or otherwise. These languages may include, but are not limited to, Xcode, iOS, cocoa, cocoa touch, MacRuby, PHP, ASP.net, HTML, HTML5, Ruby, Perl, Java, Python, C++, C#, JavaScript, and/or the Go programming language. It should be appreciated, of course, that one of skill in the art will appreciate that other languages may be used instead, or in combination with the foregoing and that web and/or mobile application frameworks may also be used, such as, for example, Ruby on Rails, Node.js, Zend, Symfony, Revel, Django, Struts, Spring, Play, Jo, Twitter Bootstrap and others. It should further be appreciated that the systems and methods disclosed herein may be embodied in software-as-a-service available over a computer network, such as, for example, the Internet. Further, the present disclosure may enable web services, application programming interfaces and/or service-oriented architecture through one or more application programming interfaces or otherwise.

FIG. 1 is a schematic view of a system for debugging application, generally indicated at 100. The system 100 includes a workstation 102, a network 108, and a web infrastructure 110.

In at least one embodiment of the present disclosure, the workstation 102 is remote from the web infrastructure 110, and connected to the web infrastructure 110 via the network 108. The workstation 102 may be configured to transmit information to and generally interact with the web infrastructure 110, over network 108. The workstation 102 may include a web browser, mobile application, socket or tunnel, or other network connected software such that communication with the web infrastructure 110 is possible over the network 108.

It will be appreciated that the workstation 102 includes one or more computers, smartphones, tablets, wearable technology, computing devices, or systems of a type well known in the art, such as a mainframe computer, workstation, personal computer, laptop computer, hand-held computer, cellular telephone, MP3 player, or personal digital assistant. The workstation 102 comprises such software, hardware, and componentry as would occur to one of skill in the art, such as, for example, one or more microprocessors, memory systems, input/output devices, device controllers, and the like. The workstation 102 also comprises one or more data entry means (not shown in FIG. 1) operable by users of the workstation 102 for data entry, such as, for example, voice or audio control, a pointing device (such as a mouse), keyboard, touchscreen, microphone, voice recognition, and/or other data entry means known in the art. The workstation 102 also comprises a display means (not shown in FIG. 1) which may comprise various types of known displays such as liquid crystal diode displays, light emitting diode display, and the like upon which information may be display in a manner perceptible to the user. It will be appreciated that workstation 102 may further comprise such software, hardware, and componentry as would occur to one of skill in the art, to operably perform the functions allocated to the workstation 102 in accordance with the present disclosure.

In at least one embodiment of the present disclosure, the workstation 102 further includes a debug environment 104 configured execute at least one development web application. The debug environment 104 includes an integrated development environment (IDE). It will be appreciated that the debug environment 104 may include a source code editor, build automation tools and a debugger, to name a few non-limiting examples. It will be appreciated that debug environment 104 may further include such software, hardware, and componentry as would occur to one of skill in the art, to operably perform the functions allocated to the debug environment 104 in accordance with the present disclosure.

In at least one embodiment of the present disclosure, the debug environment 104 is configured to receive debugging requests in real time, and execute at least one development web application, such that the debug environment 104 is functionally comparable to the web infrastructure 110. For example, the web infrastructure 110 may be configured to serve web applications (as further disclosed herein). The debug environment 104 may similarly be configured to serve web applications as well. It will be appreciated that the debug environment 104 can serve web applications comparably when compared with the web infrastructure 110.

In at least one embodiment of the present disclosure, the network 108 may include one of the different types of networks, such as, for example, Internet, intranet, local area network (LAN), wide area network (WAN), a metropolitan area network (MAN), a telephone network (such as the Public Switched Telephone Network), the internet, an optical fiber (or fiber optic)-based network, a cable television network, a satellite television network, or a combination of networks, and the like. The network 108 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. It will be further appreciated that the network 108 may include one or more data processing and/or data transfer devices, including routers, bridges, servers, computing devices, storage devices, a modem, a switch, a firewall, a network interface card (NIC), a hub, a bridge, a proxy server, an optical add-drop multiplexer (OADM), or some other type of device that processes and/or transfers data, as would be well known to one having ordinary skills in the art.

In at least one embodiment of the present disclosure, the web infrastructure 110 may include one or more servers connected via the network 108. Web infrastructure 110 can be any computing environment provided that the computing environment is capable of bi-directional data transfer via the network 108, such as, for example, in Amazon AWS, Rackspace, or other virtual infrastructure, or any business network. It will be appreciated that the web infrastructure 110 is configured to serve up web applications and web page requests. The web infrastructure 110 is configured to receive requests for a plurality of web applications therein. The requests may comprise a hypertext transfer protocol (HTTP) request, to name one, non-limiting example.

In at least one embodiment of the present disclosure, the multiplexer 112 is configured to receive a plurality of input web application requests and divert, in real time, such requests to different destinations, depending on the source of the input web application requests, the content of the input web application requests, or the destination. For example, the multiplexer 112 may receive requests to access a page on the web infrastructure 110 that is identified with a uniform resource locator (URL). Upon receipt of such request, the multiplexer 112 may redirect such a request to another URL, another page, pages, a virtual directory, or to another computer. In another example, the multiplexer 112 may receive a request from a source with a particular Internet Protocol (IP) address (e.g. from workstation 102), whereby the multiplexer 112 is configured to redirect all request from the particular IP address. In yet another example, if the multiplexer 112 receives a request that is directed to a particular destination (e.g. a port on web infrastructure 110), the multiplexer 112 may redirect such a request to a different port. It will be appreciated that the multiplexer 112 is configured to redirect requests to another folder or web site, redirect requests to a file, redirect requests to a network share, or redirect requests to a program, to name a few non-limiting examples. It will be further appreciated that multiplexer 112 may further comprise such software, hardware, and componentry as would occur to one of skill in the art, to operably perform the functions allocated to multiplexer 112 in accordance with the present disclosure, such as, for example, local port forwarding, remote port forwarding, dynamic, port forwarding, port mapping, network address translation (NAT), masquerading, remapping destination internet protocol (IP) addresses, hostname to IP address mapping, domain redirects, hypertext transfer protocol (HTTP) redirects, proxy redirects, cookie based redirect, data based redirect, transport layer protocol redirect, and application based redirects.

In at least one embodiment of the present disclosure, the multiplexer 112 may be configured to redirect any requests to at least one application of the plurality of applications on the web infrastructure 110. For example, the web infrastructure 110 may host an online ordering application, and a video content distribution application, that can be presented via the server 114. If the online ordering application (or an application component of the online ordering application) needs debugging, the multiplexer 112 may be configured to redirect any requests to the online ordering application, to a different destination. It will be appreciated that the multiplexer 112 can redirect all requests to the online ordering application, or can only redirect a subset of the requests to the online ordering application. For example, if the source of the request is from a web application developer (e.g. from workstation 102), or if the request is embedded with information (e.g. via HTTP headers) indicative of the request being a request to debug the online ordering application, the multiplexer will only redirect such requests, while allowing any other requests to proceed to the server 114.

In at least one embodiment of the present disclosure, the web infrastructure 110 further includes a web server 114, a multiplexer 112, and a database 116. It will be appreciated that the web server 114 includes one or more servers or computing devices capable of hosting and/or serving up web applications, as would be known to one having ordinary skills in the art. It will be further appreciated that the web infrastructure may host a plurality of web applications, the each of the plurality of web applications being stored on the database 116.

In at least one embodiment of the present disclosure, the database 116 is shown in FIG. 1, and referred to herein as a single database. It will be appreciated by those of ordinary skill in the art that database 116 may comprise a plurality of databases connected by software systems of a type well known in the art, which collectively are operable to perform the functions delegated to database 116 according to the present disclosure. Database 116 may also be part of distributed data architecture, such as, for example, a Hadoop architecture, for big data services. Database 116 may comprise relational database architecture, noSQL, OLAP, or other database architecture of a type known in the database art. Database 116 may comprise one of many well-known database management systems, such as, for example, SQL databases, NoSQL databases, MICROSOFT's SQL Server, MICROSOFT's ACCESS, MongoDB, Redis. Hadoop, or IBM's DB2 database management systems, or the database management systems available from ORACLE or SYBASE, and any other services required for the application as would be known to one having ordinary skill in the arts. Database 116 retrievably stores information that is communicated to database 116 from within web infrastructure 110 or workstation 102.

Referring now to FIG. 2, there is shown a method for debugging applications on a developer workstation in real time, generally indicated at 200. The method 200 includes: step 202 of configuring the multiplexer 112 to redirect to the debug environment, a debugging request; step 204 of initiating at the workstation 102, a debugging request; step 206 of routing by the network 108, the debugging request to the web infrastructure 110; step 208 of receiving at the multiplexer 112, a web application request; step 210 of redirecting at the multiplexer 112, the web application request, if it is determined the web application request comprises the debugging request; step 212 of routing by the network 108, the debugging request to the debug environment 104; step 214 of operating at the debug environment 104, a development web application; and step 216 of debugging at debug environment 104, the development web application.

At step 202 the multiplexer 112 is configured to redirect to the debug environment 104, any debugging request, the debugging request comprising a web application request for at least one application of a plurality of applications on the web infrastructure 110. It will be appreciated that the debugging request may include information about the source of the debugging request (e.g. the IP address), or have data embedded therein (e.g. via HTTP headers) indicative of a debugging request. It will be further appreciated that the multiplexer 112 is configured to receive other (non-debugging) requests, wherein such requests are not redirected, but routed to the web server 114.

At step 204, a workstation application request is initiated at the workstation 102. In at least one embodiment of the present disclosure, a web application developer may use the browser 106 to initiate a workstation application request for at least one web application of the plurality of web applications on the web infrastructure 110. For example, when the web application developer attempts to debug the at least one web application of the plurality of web applications, the web application developer my operate the browser 106, and request the at least one web application from the web infrastructure 110, via a HTTP GET, to name one non-limiting example. It will be appreciated that the workstation application request may further include information identifying the browser 106 (e.g. via a user agent), as well as identification of the source of the debugging request (e.g. the IP address of the workstation 102, or other hardware identification of the workstation 102).

At step 206 the debugging request is routed by the network 108, to the web infrastructure 110. It will be appreciated that the network 108 is configured to transmit any request for any of the plurality of web applications on the web infrastructure 110.

At step 208, the multiplexer 112, receives the workstation application request. Continuing with the example above, the multiplexer 112 may receive the workstation application request for the online ordering application, and/or the video content distribution application.

At step 210, the multiplexer 112, determines if the workstation application request comprises a debugging request. If the multiplexer 112 identifies that the workstation application request is indeed a debugging request, the multiplexer will redirect the workstation application request to the debug environment 104. If the multiplexer 112 identifies that the workstation application request is a standard application request, the multiplexer 112 will forward the web application request to the server 114, whereby the server 114 will service such request. In at least one embodiment of the present disclosure, the multiplexer 112 may also receive application requests from other sources, wherein such requests do not include a debugging request. It will be appreciated that debugging requests are redirected by the multiplexer 112, while all other requests are handled routinely (i.e. by forwarding the request to the server 114). It will be appreciated that the multiplexer 112 allows for seamless redirection of debugging requests.

At step 212 the network 108 routes the workstation application request from the multiplexer 112, to the debug environment 104.

At step 214, the debug environment 104 is operated to execute at least one development web application. Continuing with the example above, when a web application developer desires to debug an application, the web application developer may instantiate at least one development web application version of the web application to be debugged, on the debug environment 104. It will be appreciated that the development web application on the debug environment 104 allows for the web application developer to validate the operation of the development web application, in real time, and in tandem with the web application on the web infrastructure 110, but without impacting the operation of the web application on the web infrastructure 110, and vice versa. After the instantiation of the development web application on the debug environment 104, all debugging requests transmitted to the web infrastructure 110 are redirected by the multiplexer 114, and served by the development web application on the debug environment 104, instead of the server 114. It will be appreciated that the debug environment 104 is operably connected to the database 116 such that any data that is necessary in the operation of the development web application can be retrieved from database 116. It will be further appreciated that this enables the web application developer to use 'production' data (i.e. the data stored on database 116) while testing and evaluating the development web application on the debug environment 104.

At step 216, the development web application is debugged in the debug environment 104. It will be appreciated that any issues identified with the development web application can be addressed without affecting the operation of the web application on web infrastructure 110.

In at least one embodiment of the present disclosure, after the debugging is completed, the multiplexer 112 is operated to disable any redirects, such that all web application requests will be forwarded to the server 114 and handled without any redirections.

In at least one embodiment of the present disclosure, the at least one development web application may be promoted to the web infrastructure 114, such that the development web application replaces the prior existing version of the web application. It will be appreciated that this can be achieved in real time to ensure that the availability of the web application on web infrastructure 110 is not affected by the update.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed is:

1. A system for debugging web applications, the system comprising:

a web infrastructure connected to a network, the web infrastructure comprising at least one web server, the web infrastructure further configured to serve requests for a plurality of web applications therein, via the at least one web server;

the web infrastructure further comprising a multiplexer, the multiplexer configured to redirect in real time, debugging requests for at least one of the plurality of web applications, wherein the multiplexer redirects debugging requests to different destinations depending on the source of the request, the content of the request, or the destination; and, a workstation remote from the web infrastructure and connected to the web infrastructure via the network, the workstation configured to receive debugging requests in real time, and comprising a debug environment configured to execute at least one development web application.

2. The system of claim 1, wherein the debug environment is connected to the multiplexer via the network.

3. The system of claim 1, wherein the web infrastructure further comprises at least one database.

4. The system of claim 3, wherein the debug environment is connected to the at least one database via the network.

5. The system of claim 1, wherein the debug environment is functionally comparable to the web infrastructure.

6. The system of claim 1, wherein the debug environment comprises an integrated development environment.

7. A method for operating a system for debugging web applications, the system comprising a web infrastructure and a workstation connected to one another, the web infrastructure comprising, a web server, a multiplexer, and a database, and the workstation comprising a debug environment, the method comprising:

a. configuring the multiplexer to redirect to the debug environment, any debugging request, the debugging request comprising a web application request for at least one application of a plurality of applications on the web infrastructure;

b. initiating at the workstation, a workstation application request;

c. routing by the network, the workstation application request to the web infrastructure;

d. receiving at the multiplexer, the workstation application request;

e. redirecting at the multiplexer, the workstation application request, if it is determined the workstation application request comprises a debugging request, wherein the multiplexer redirects debugging requests to different destinations depending on the source of the request, the content of the request, or the destination; and, f. routing by the network, the workstation application request to the debug environment.

8. The method of claim 7 further comprising the step of executing at the debug environment, at least one development web application.

9. The method of claim 7 further comprising the step of debugging at debug environment, the at least one development web application.

10. The method of claim 7, wherein step (d) further comprises receiving at the multiplexer, a plurality of requests for the at least one application of the plurality of applications on the web infrastructure.

11. The method of claim 10, further comprising the step of directing each of the plurality of requests for the at least one application, to the web server, if it is determined each of the plurality of requests for the at least one application does not comprise a debugging request.

12. The method of claim 9 further comprising the step of promoting the at least one development web application to the web infrastructure to replace the at least one application of the plurality of applications on the web infrastructure.

\* \* \* \* \*